US009837680B2

(12) United States Patent
Poirot-Crouvezier

(10) Patent No.: US 9,837,680 B2
(45) Date of Patent: Dec. 5, 2017

(54) LIGHTWEIGHT STACK OF MEMBRANE/ELECTRODE ASSEMBLIES

(71) Applicant: COMMISSARIAT A L'ENERGIE ATOMIQUE ET AUX ENERGIES ALTERNATIVES, Paris (FR)

(72) Inventor: Jean-Philippe Poirot-Crouvezier, Saint Georges de Commiers (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/115,735

(22) PCT Filed: Feb. 3, 2015

(86) PCT No.: PCT/FR2015/050250
§ 371 (c)(1),
(2) Date: Aug. 1, 2016

(87) PCT Pub. No.: WO2015/118257
PCT Pub. Date: Aug. 13, 2015

(65) Prior Publication Data
US 2017/0170506 A1    Jun. 15, 2017

(30) Foreign Application Priority Data

Feb. 4, 2014    (FR) .................................... 14 50862

(51) Int. Cl.
*H01M 8/24*    (2016.01)
*H01M 8/2404*    (2016.01)
(Continued)

(52) U.S. Cl.
CPC ....... *H01M 8/2404* (2016.02); *H01M 8/2483* (2016.02); *H01M 2008/1095* (2013.01)

(58) Field of Classification Search
CPC ....... H01M 2008/1095; H01M 8/2404; H01M 8/2483
See application file for complete search history.

(56) References Cited

U.S. PATENT DOCUMENTS 6,358,641 B1    3/2002 Mease
2002/0045087 A1    4/2002 Sugita et al.
(Continued)

FOREIGN PATENT DOCUMENTS

EP    1 826 851 A1    8/2007
JP    2005-158344 A    6/2005

OTHER PUBLICATIONS

International Search Report dated May 4, 2015 in PCT/FR2015/050250 filed Feb. 3, 2015.

*Primary Examiner* — Carlos Barcena
(74) *Attorney, Agent, or Firm* — Oblon, McClelland, Maier & Neustadt, L.L.P.

(57) ABSTRACT

A method for manufacturing an electrochemical reactor, including: holding in position a first tube and a shaft extending in a same direction, the first tube including a bore in which a beam is housed; forming a stack which alternates bipolar plates and membrane/electrode assemblies, each bipolar plate and each membrane/electrode assembly including first and second openings through which the first tube and the shaft respectively extend; compressing the stack between two mechanical components and removing the beam from the bore of the first tube; and connecting the bore of the first tube to a fluid flow circuit of the electrochemical reactor.

12 Claims, 4 Drawing Sheets

(51) Int. Cl.
*H01M 8/2483* (2016.01)
*H01M 8/1018* (2016.01)

(56) References Cited

U.S. PATENT DOCUMENTS

| | | |
|---|---|---|
| 2004/0018407 A1 | 1/2004 | Barbir et al. |
| 2005/0112442 A1* | 5/2005 | Wells ................ H01M 8/0271 |
| | | 429/535 |
| 2006/0051651 A1 | 3/2006 | Rock et al. |
| 2006/0199055 A1 | 9/2006 | Barbir et al. |
| 2006/0199056 A1 | 9/2006 | Barbir et al. |
| 2006/0199067 A1 | 9/2006 | Barbir et al. |
| 2007/0082250 A1* | 4/2007 | Suzuki ................ H01M 8/008 |
| | | 429/434 |
| 2010/0279195 A1 | 11/2010 | Rock et al. |

* cited by examiner

LIGHTWEIGHT STACK OF MEMBRANE/ELECTRODE ASSEMBLIES

The invention relates to stacks of membranes/electrodes assemblies and in particular those used in electrochemical reactors such as fuel-cell stacks or hydrolysis devices.

Fuel-cell stacks are especially envisioned as sources of energy for mass-produced automotive vehicles in the future. A fuel-cell stack is an electrochemical device that converts chemical energy directly into electrical energy. A fuel-cell stack comprises a stack of a plurality of cells in series. Each cell generates a voltage of about 1 volt, and their stacking allows a supply voltage of a higher level, for example of about 100 V, to be generated.

Among the known types of fuel-cell stacks, mention may especially be made of proton-exchange-membrane (PEM) fuel-cell stacks. Such fuel-cell stacks have particularly advantageous compactness properties. Each cell comprises an electrolytic membrane allowing only protons and not electrons to pass. The membrane comprises an anode on a first face and a cathode on a second face in order to form a membrane/electrodes assembly (MEA).

At the anode, fuel such as dihydrogen is ionized to produce protons passing through the membrane. The electrons produced by this reaction migrate toward a flow plate, then pass through an electrical circuit that is external to the cell to form an electrical current. At the cathode, oxygen is reduced and reacts with the protons to form water.

The fuel-cell stack may comprise a plurality of what are called bipolar plates, which are for example made of metal. The membrane/electrodes assemblies are placed between two bipolar plates. The fuel-cell stack thus includes a stack of bipolar plates and membrane/electrodes assemblies in alternation. Gas diffusion layers are interposed between the electrodes and the bipolar plates and make contact with the bipolar plates.

The bipolar plates may comprise flow channels and orifices for guiding the reactants and products toward/from the membrane, for guiding the cooling fluid, and for separating various compartments. The bipolar plates are also electrically conductive in order to form collectors of the electrons generated at the anode. The bipolar plates also have a mechanical function in transmitting stack clamping stresses necessary for the quality of the electrical contact. Electronic conduction is achieved through the bipolar plates, and ionic conduction is obtained through the membrane. The stack of cells is compressed between end plates.

The separation of the various compartments is essential to the good operation of the fuel-cell stack. Such a separation generally involves compressed seals between the bipolar plates. The geometric precision of the assembly of the stack is important if its seal tightness and its performance are to be guaranteed. It is especially important to guarantee the precision of the alignment between the seals and the bipolar plates and the precision of the alignment of the points of conduction of the produced electrical current.

Patent FR2897986 describes the use of a stack passed through on either side by two orifices. Cylindrical centering bars are housed in these orifices and have a length at least equal to the thickness of the stack. The combination of the cylindrical bars and the orifices guarantees the alignment of the various bipolar plates and membrane/electrodes assemblies of the stack. The cylindrical bars have a surface made of insulating material in order to prevent electrical conduction with the components of the stack.

Similar stacks are also used for electrolyzers with like requirements.

Generally, there is a need to decrease the bulk and weight of these stacks, in particular for on-board applications. In order to decrease the weight of the stack, it is known to use such cylindrical bars to provide an anchor function, by applying to them a tensile stress between the terminal plates.

On the one hand, there is a need to further solve the weight and bulk of the stack, the anchor function especially requiring bars of relatively large size and hence of relatively high weight. On the other hand, certain stacked geometries are incompatible with the use of centering bars as stack anchors.

The invention aims to solve one or more of these drawbacks. The invention thus relates to a process for manufacturing an electrochemical reactor such as defined in the appended claims.

Other features and advantages of the invention will become more clearly apparent from the description that is given thereof below by way of completely nonlimiting indication and with reference to the appended drawings, in which.

Figure 1:
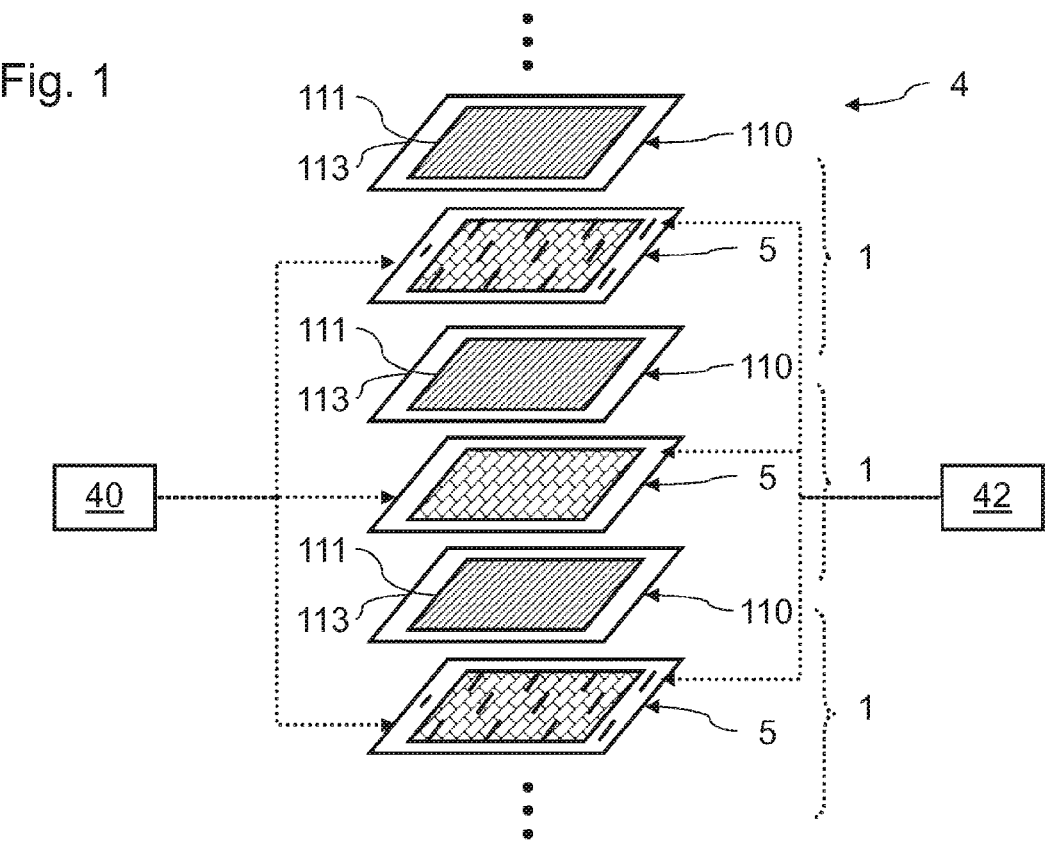
FIG. 1 is an exploded perspective view of an exemplary stack of membrane/electrodes assemblies and bipolar plates for a fuel-cell stack.

FIG. 1 is a schematic exploded perspective view of a stack of cells 1 of a fuel-cell stack 4. The fuel-cell stack 4 comprises a plurality of superposed cells 1. The cells 1 are cells of the proton-exchange-membrane or polymer-electrolyte-membrane type.

The fuel-cell stack 4 comprises a fuel source 40. The fuel source 40 here supplies dihydrogen to an inlet of each cell 1. The fuel-cell stack 4 also comprises an oxidant source 42. The oxidant source 42 here supplies air to an inlet of each cell 1, the oxygen of the air being used as oxidant. Each cell 1 also comprises exhaust channels. Each cell 1 also has a cooling circuit.

Each cell 1 comprises a membrane/electrodes assembly 110 or MEA 110. A membrane/electrodes assembly 110 comprises an electrolyte 113, a cathode 112 (not illustrated) and an anode 111 which are placed on either side of the electrolyte and fastened to this electrolyte 113.

Between each pair of adjacent MEAs, a bipolar plate 5 is placed. Each bipolar plate 5 defines anodic flow channels and cathodic flow channels. Some bipolar plates also define cooling fluid flow channels between two successive membrane/electrodes assemblies. The bipolar plates 5 may be formed as is known per se from one or more conductive metal sheets, which are for example made from stainless steel, or from titanium alloy, or from aluminum alloy, or from nickel alloy or from tantalum alloy. The bipolar plates may also be obtained by other processes such as molding or injection molding from carbon-polymer composites.

Figure 2:
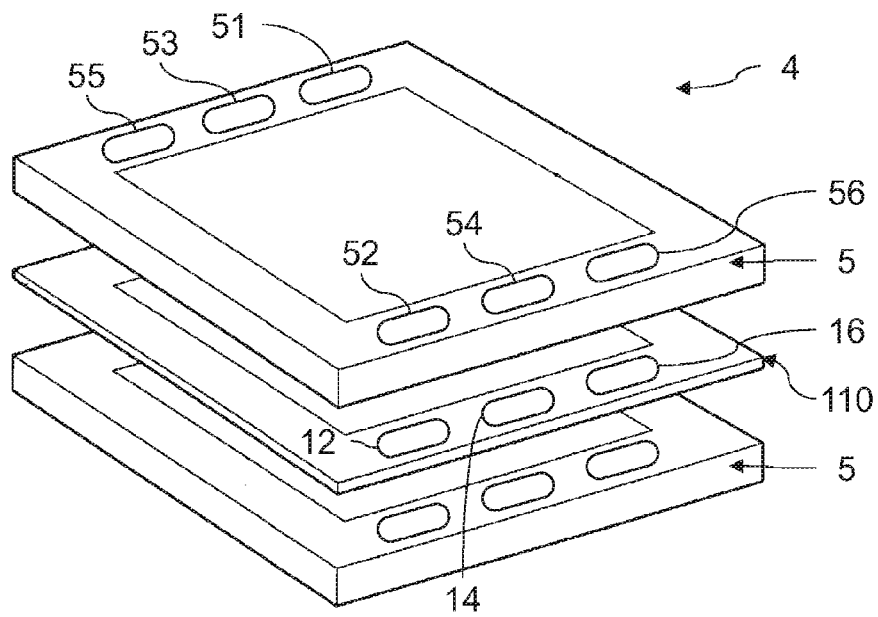
FIG. 2 is an exploded perspective view of bipolar plates and a membrane/electrodes assembly that are intended to be stacked to form flow ducts through the stack.

FIG. 2 is an exploded perspective view of two bipolar plates 5 and of a membrane/electrodes assembly that are intended to be stacked in a manufacturing process according to the invention. The stack of the bipolar plates 5 and the membrane/electrodes assemblies 110 is intended to form a plurality of flow ducts. For this purpose, respective orifices are produced through the bipolar plates 5 and through the membrane/electrodes assemblies 110. The bipolar plates 5 thus include orifices 51, 53 and 55 at a first end, and orifices 52, 54 and 56 at a second end opposite the first. The orifice 51 for example serves to form a fuel supply duct; the orifice 56 for example serves to form a duct for evacuating combustion residues; the orifice 53 for example serves to form a duct for supplying cooling fluid; the orifice 54 for example serves to form a duct for evacuating cooling liquid; the orifice 52 for example serves to form a duct for supplying oxidant; and the orifice 55 for example serves to form a duct for evacuating water.

The orifices of the bipolar plates 5 and of the membrane/electrodes assemblies 110 are placed facing one another in order to form the flow ducts. Orifices 12, 14 and 16 are for example produced in the membrane/electrodes assemblies 110 and are placed facing orifices 52, 54 and 56, respectively. Seals (not illustrated) may be interposed between the bipolar plates 5 or between the bipolar plates 5 and the membrane/electrodes assemblies 110 in order to ensure a seal tightness on the periphery of the stack or around the through-orifices.

Figure 3:
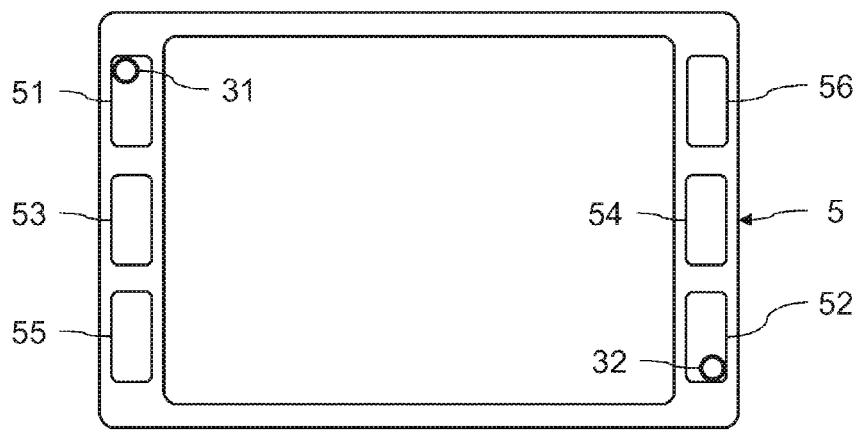
FIG. 3 is a top view of a bipolar plate including flow orifices passed through by tubes.

FIG. 3 is a top view of a bipolar plate 5 of a stack of the fuel-cell stack 4 at the end of its assembly. The fuel-cell stack 4 includes a tube 31 and a shaft formed from a tube 32 in this example. The tubes 31 and 32 extend in the same direction. The tubes 31 and 32 extend in the stacking direction, i.e. in a direction normal to the bipolar plates 5 and to the membrane/electrodes assemblies 110. The tubes 31 pass through superposed orifices of the bipolar plates 5 (orifices 51) and of the membrane/electrodes assemblies 110, forming a flow duct. The tubes 32 pass through superposed orifices of the bipolar plates 5 (orifices 52) and of the membrane/electrodes assemblies 110 (orifices 12), forming a flow duct.

Figure 4:
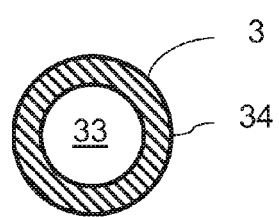
FIG. 4 is a cross-sectional view of an exemplary tube.

FIG. 4 illustrates a cross-sectional view of a tube 3 able to be used as tube 31 or as tube 32. The tube 3 is a hollow tube and includes a bore 33. The bore 33 for example extends along all the length of the tube 32. The bore 33 is delimited by a peripheral wall 34.

The invention proposes to use at least one tube 31 and a shaft (here the tube 32) that are held in position in orifices of the bipolar plates 5 or membrane/electrodes assemblies 110 during the formation of an alternating stack of these bipolar plates 5 and these membrane/electrodes assemblies 110. During the formation of the stack, a beam is housed in the bore 33 of the tube 31 in order to rigidify this tube 31 and thus prevent it from being deformed or degraded. The tube 31 and the shaft ensure a relative positioning of the membrane/electrodes assemblies 110 and of the bipolar plates 5 during the formation of the stack by contact with borders of the various orifices.

At the end of the formation of the stack, this stack is compressed between two mechanical components and the beam is removed from the bore of the tube 31. Because of the support provided by the beam during the formation of the stack, the tube 31 may have a thin wall 34 leading to a lower weight after the beam has been removed, without however risking its deterioration. Moreover, the bore of the tube 31 participates in the fluid flow, thereby allowing the section of the orifices passing through the components of the stack to be limited. In addition, the section of the orifices passing through the bipolar plates and the membrane/electrodes assemblies is here functional since it is passed through by a flow of fluids. Because of the use of beams during the formation of the stack, a thin wall 34 may be used and thus the optimal section of the bore 33 for a fluid flow favored. These components are thus easier to manufacture and have a higher compactness. The cross section of the bore 33 of the tube 31 will advantageously be at least equal to 50% of the cross section of this tube 31 (i.e. the area bounded by the periphery of the wall 34).

Figure 5:
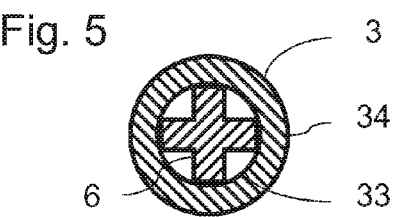
FIG. 5 is a cross-sectional view of the tube in FIG. 4 inside of which a stiffener has been placed.

An exemplary beam 6 is illustrated with reference to the cross-sectional view in FIG. 5. In this figure, a beam 6 is housed in the bore 33 of a tube 3. To facilitate the insertion or removal of the beam 6 into/from the bore 33, the adjustment between this bore 33 and the beam 6 is preferably of sliding type. Moreover, the beam 6 will possibly have any appropriate shape for its cross section, in order to limit its area of contact and friction with the wall 34 of the tube 3. The beam 6 will possibly for example have a cross shape as illustrated, a hexagonal shape or even an octagonal shape.

Figure 13:
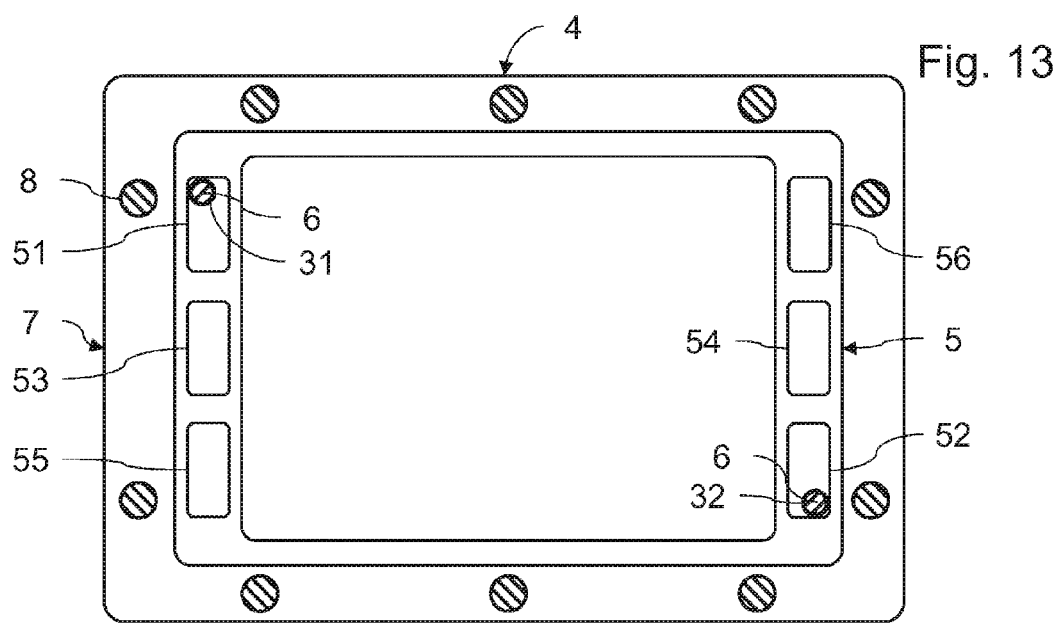
FIG. 13 is a top view of an electrochemical reactor during assembly.

FIG. 13 is a cross-sectional view from above of a fuel-cell stack 4 during the formation of an alternating stack of bipolar plates 5 and membrane/electrodes assemblies 110.

To implement an exemplary process for manufacturing the fuel-cell stack 4, a mechanical component 7, for example an end plate, is positioned beforehand. Such a mechanical component is especially intended to apply mechanical stresses to the stack with a minimum of deformation. The tubes 31 and 32 are fixed or held in position at opposite ends of this end plate. Positioning the tubes 31 and 32 at opposite ends of the end plate 7 promotes the precision of the relative positioning of the various components of the stack to be formed. The tubes 31 and 32 extend perpendicularly to this end plate 7. One end of the tubes 31 and 32 is for example fitted into a respective housing of the end plate 7. Moreover, anchors 8 are fastened to this end plate 7. The anchors 8 extend in the same direction as the tubes 31 and 32. The anchors 8 for example have one threaded end screwed into the end plate 7. Beams 6 are respectively housed in the tubes 31 and 32 in order to rigidify them.

A membrane/electrodes assembly 110 is added so that at least two of its orifices are respectively passed through by the tubes 31 and 32. At least one of these orifices has a cross section larger than the cross section of the tube that passes therethrough. The tubes 31 and 32 preferably each have at least one point of contact with the periphery of the respective orifice through which they pass.

A bipolar plate 5 is added so that at least two of its orifices are respectively passed through by the tubes 31 and 32. At least one of these orifices has a cross section larger than the cross section of the tube that passes therethrough. The tubes 31 and 32 preferably each have at least one point of contact with the periphery of the respective orifice through which it passes. The orifices of the bipolar plate 5 are superposed on the orifices of the membrane/electrodes assembly 110.

The formation of the stack continues with the addition in a similar way of the membrane/electrodes assemblies 110 and guiding plates 5, so as to form an alternation of these bipolar plates 5 and these membrane/electrodes assemblies 110.

Because of the points of contacts of the respective orifices of the guiding plates 5 and of the membrane/electrodes assemblies 110 with the tubes 31 and 32, an excellent relative positioning between the various components of the stack is obtained.

Gas diffusion layers (not illustrated) may be interposed between the guiding plates 5 and the membrane/electrodes assemblies 110.

At the end of the formation of the stack, another end plate 7 is added. This end plate typically includes through-bores passed through by the free end of the anchors 8. The stack is compressed between the end plates 7, for example by means of cylinders, or by applying a traction to the anchors 8. For example, screws may be fixed to the free end of each of the anchors 8, and the screws are then screwed so as to compress the stack.

During or after this compression, the transverse (for example shear) stresses liable to be exerted on the tubes 31 and 32 are relatively limited, the assembly of the stack and of the end plates 7 by way of the anchors 8 then having a sufficient mechanical strength. The beams 6 may then be removed, so as to lighten the fuel-cell stack 4 and to free the bores 33 of the tubes 31 and 32.

The bore 33 of the tubes 31 and 32 are placed in communication with a fluid flow circuit of the fuel-cell stack. For example, the tube 31 is used to conduct a fuel flow and the tube 32 is used to conduct an oxidant flow.

Figure 6:
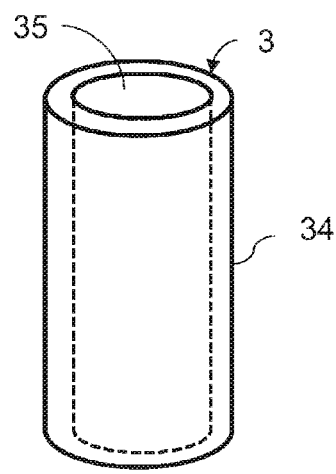
FIGS. 6 to 8 are perspective views of various variants tubes.
Figure 7:
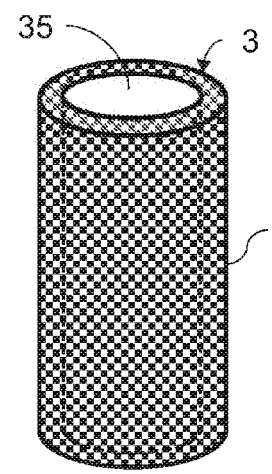
Figure 8:
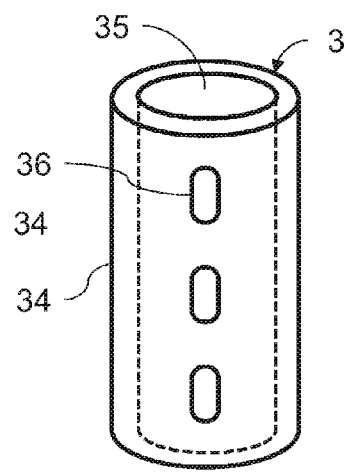

Various types of tubes 3 may be placed through the orifices of the bipolar plates 5 or of the membrane/electrodes assemblies 110. FIG. 6 is a perspective view of a first exemplary tube 3. The wall 34 of the tube 3 is here unapertured and seal-tight. The bore 33 may thus be accessed only via a free end 35 of the tube 3. FIG. 7 is a perspective view of a second exemplary tube 3. The wall 34 of the tube is here unapertured and porous. The bore 33 may thus be accessed through all the surface of the wall 34. FIG. 8 is a perspective view of a third exemplary tube 3. The wall 34 here includes a plurality of orifices 36 passing therethrough and distributed over the length of the tube 3. The orifices 36 allow the bore to be accessed over the length of the tube 3, with reduced head loss with respect to the example in FIG. 7. The use of the beams 6 allows tubes 3 with porous or drilled walls 34, and thus walls having a lower rigidity and mechanical strength, to be used.

In order to limit the weight of a tube 3, its cross section will advantageously be as small as possible while guaranteeing its mechanical strength during the formation of the stack. The cross section of the orifices passed through by such a tube 3 is advantageously at least three times the cross section of this tube 3.

To prevent any short-circuit between the bipolar plates 5, the external surface of the tubes 31 and 32 is electrically insulating. The tubes 31 and 32 may for example be coated with an electrically insulating layer. The tubes 31 and 32 may also be made of electrically insulating materials. The tubes 31 and 32 may for example be made of insulating plastic materials, for example of PTFE. Beams 6 made of material having a clearly higher modulus of elasticity than that of the tubes 31 and 32 may be used. Beams 6 made of steel may especially be used.

Figure 9:
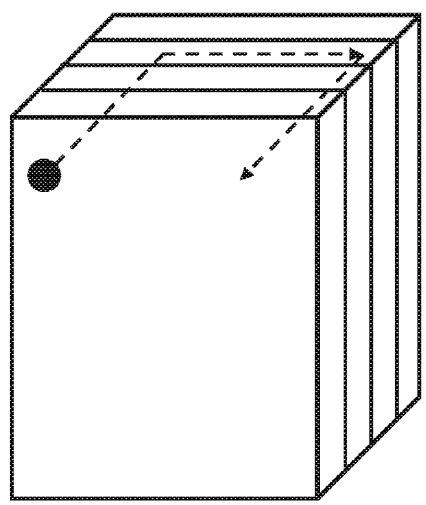
FIGS. 9 and 10 illustrate exemplary flow circuits able to be formed through the stack by way of tubes.
Figure 10:
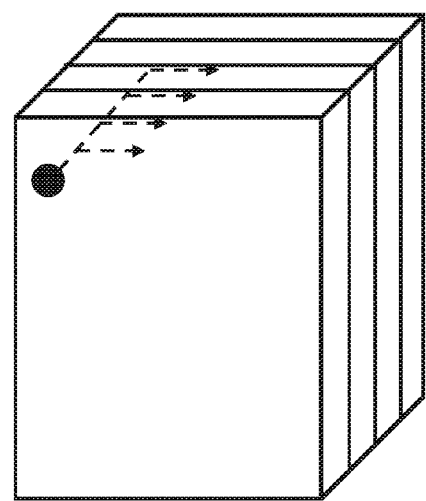

FIGS. 9 and 10 schematically illustrate in perspective various types of flow circuits able to be formed by way of tubes 3 passing through orifices of the stack. The flow circuits are here schematically illustrated by discontinuous lines.

In FIG. 9, a seal-tight tube passes through the stack and conducts a flow right through the depth of the stack. A flow channel for example produced in one end plate communicates with this seal-tight tube in order to conduct the flow as far as another end of the stack. This flow channel communicates with another seal-tight tube passing through the stack. Such a configuration for example makes it possible to avoid having to tediously connect on the exterior of the stack with connectors of flow circuits at the level of a given face of this stack. Such a configuration also makes it possible to insulate a fluid flow from components of the stack or from other fluids.

In FIG. 10, a tube having orifices in its wall 34 passes through the stack. Such a perforated tube allows the fluid passing through its bore to be tapped off at various levels in the stack.

Figure 11:
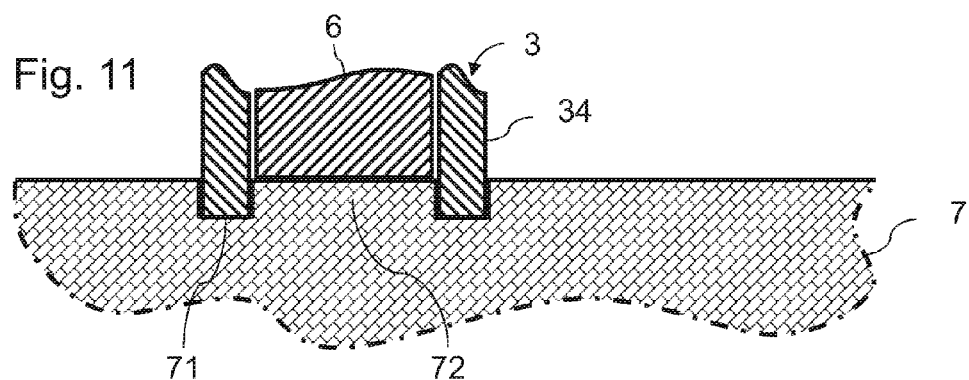
FIG. 11 is a cross-sectional side view of a tube fitted into a first example of an end plate.

FIG. 11 illustrates a tube 3 held in position on an end plate 7 during the formation of a stack. The wall 34 of the tube 3 is typically fitted into a circular groove 71. The tube 3 is for example a tube such as illustrated in FIGS. 7 and 8. A pad 72 is here formed and penetrates into the end of the bore of the tube 3. The end of the bore of the tube 3 is here plugged by the pad 72. The beam 6 passes through the bore of the tube 3 over all its length and abuts against the pad 72.

Figure 12:
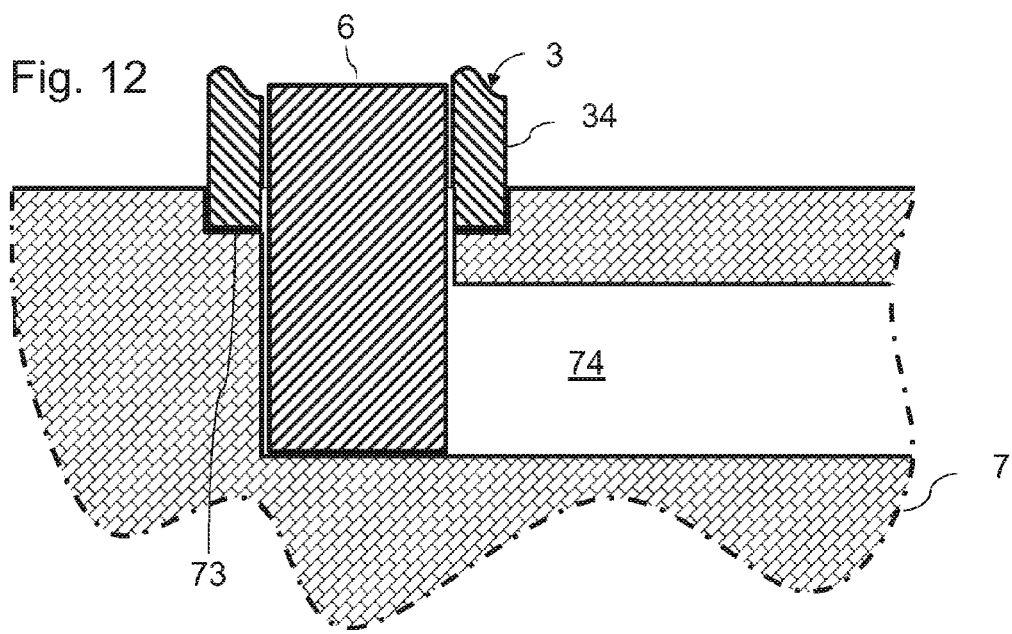
FIG. 12 is a cross-sectional side view of a tube fitted into a second example of an end plate.

FIG. 12 illustrates a tube 3 held in position on another end plate 7 during the formation of a stack. The wall 34 of the tube 3 is typically fitted into a circular countersink 73. The tube 3 is for example a tube such as illustrated in FIG. 6. A bore is produced in the median portion of the countersink and communicates with a flow duct 74 of the end plate 7. The beam 6 passes through the bore of the tube 3 over all its length and abuts against the bottom of the flow duct 74.

Tubes of circular section have been described here. Other shapes may of course be envisioned for the sections of the tubes, depending on the requirements of the application.

In the described examples, at least one tube and one shaft pass through the orifices of the components of the stack. Provision may be made for at least three elongate elements (tubes and/or shafts) to pass through three orifices of the components of the stack in order to further increase the precision of the positioning of these components. Advantageously, at most three elongate elements are used in order to avoid creating needless constraints associated with overly restrictive guiding.

The stack may be formed with the tubes positioned vertically during the placement of the various membrane/electrodes assemblies and of the bipolar plates. Although a higher shear stress is then applied to the tubes, the stack may also be formed with the tubes positioned horizontally during the placement of the various membrane/electrodes assemblies and of the bipolar plates. When the tubes are horizontally positioned with a view to forming the stack, the dimensions of this tube and/or of the housed beams are increased in order to allow the weight of the various components of the stack to be withstood.

The invention was illustrated in the preceding examples with reference to an electrochemical reactor forming a fuel-cell stack 4. The invention also applies to other types of electrochemical reactors including a stack of membrane/electrodes assemblies and bipolar plates, for example an electrolyzer.

The invention claimed is:

1. A process for manufacturing an electrochemical reactor, comprising:
    holding in position a first tube and a shaft extending in a same direction, the first tube including a bore in which a beam is housed;
    forming a stack of an alternation of bipolar plates and membrane/electrodes assemblies, each bipolar plate and each membrane/electrodes assembly including first and second orifices passed through by the first tube and by the shaft, respectively;

compressing the stack between two mechanical components and removing the beam from the bore of the first tube;

bringing the bore of the first tube into communication with a fluid flow circuit of the electrochemical reactor.

2. The process for manufacturing an electrochemical reactor as claimed in claim 1, wherein the shaft is a second tube including a bore in which a beam is housed during the holding in position, the compressing and removing further including removing the beam from the bore of the second tube.

3. The process for manufacturing an electrochemical reactor as claimed in claim 1, wherein the first tube and the shaft that are held in position have an electrically insulating external surface.

4. The process for manufacturing an electrochemical reactor as claimed in claim 1, wherein the first and second orifices of the bipolar plates and the stacked membrane/electrodes assemblies are positioned at opposite ends of the bipolar plates and the membrane/electrodes assemblies, respectively.

5. The process for manufacturing an electrochemical reactor as claimed in claim 1, further comprising holding in position first and second anchors extending parallelly to the first tube, the compressing of the stack being carried out by applying a traction to the first and second anchors using the first and second mechanical components.

6. The process for manufacturing an electrochemical reactor as claimed in claim 1, wherein an adjustment between the first tube and the beam housed in its bore is of sliding type.

7. The process for manufacturing an electrochemical reactor as claimed in claim 1, wherein the section of the first orifice of the bipolar plates and of the membrane/electrodes assemblies of the stack is at least three times the cross section of the first tube.

8. The process for manufacturing an electrochemical reactor as claimed in claim 1, wherein the cross section of the bore of the held-in-position first tube is at least equal to 50% of the cross section of the first tube.

9. The process for manufacturing an electrochemical reactor as claimed in claim 1, wherein the held-in-position first tube includes a peripheral wall delimiting the bore, the peripheral wall being porous.

10. The process for manufacturing an electrochemical reactor as claimed in claim 1, wherein the held-in-position first tube includes a peripheral wall delimiting the bore, the peripheral wall including a plurality of orifices passing therethrough and distributed in a same direction.

11. The process for manufacturing an electrochemical reactor as claimed in claim 1, further comprising connecting the flow circuit to a fuel source, an oxidant source, or a source of cooling fluid.

12. The process for manufacturing an electrochemical reactor as claimed in claim 1, wherein a periphery of each first orifice of the bipolar plates and the membrane/electrodes assemblies of the formed stack makes contact with the first tube and wherein a periphery of each second orifice of the bipolar plates and the membrane/electrodes assemblies of the formed stack makes contact with the shaft.

\* \* \* \* \*